United States Patent
Asano et al.

(10) Patent No.: US 6,458,457 B1
(45) Date of Patent: Oct. 1, 2002

(54) FILLER-FREE GRANULAR POLYTETRAFLUOROETHYLENE POWDER AND PROCESS FOR PRODUCING THE SAME

(75) Inventors: Michio Asano; Masayuki Tsuji, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/381,129

(22) PCT Filed: Feb. 19, 1998

(86) PCT No.: PCT/JP98/00722

§ 371 (c)(1),
(2), (4) Date: Sep. 16, 1999

(87) PCT Pub. No.: WO98/41567

PCT Pub. Date: Sep. 24, 1998

(30) Foreign Application Priority Data

Mar. 17, 1997 (JP) .............................. 9-084489
Dec. 24, 1997 (JP) .............................. 9-367319

(51) Int. Cl.$^7$ .......................... B32B 5/16; C08L 27/12; C08F 14/18
(52) U.S. Cl. ..................... 428/402; 524/546; 526/250
(58) Field of Search .................... 523/334; 524/544, 524/545, 546, 801, 805; 428/357, 402; 526/242, 250

(56) References Cited

U.S. PATENT DOCUMENTS

| 3,674,736 A | 7/1972 | Lerman et al. ........... 260/41 R |
| 3,766,133 A | 10/1973 | Roberts et al. ........... 260/41 R |
| 3,882,217 A | 5/1975 | Banham et al. ............. 264/117 |
| 4,241,137 A | * 12/1980 | Izumo et al. ................ 428/402 |
| 6,037,402 A | * 3/2000 | Asano et al. ................ 524/545 |
| 6,281,281 B1 | * 8/2001 | Asano et al. ................ 524/546 |
| 6,300,408 B1 | * 10/2001 | Asano et al. ................ 524/544 |

FOREIGN PATENT DOCUMENTS

| JP | 0 794 213 A2 | 9/1997 |
| WO | WO 93/16126 | 8/1993 |
| WO | WO97/15611 | * 1/1997 |

OTHER PUBLICATIONS

European Search Report dated Aug. 8, 2000.

* cited by examiner

*Primary Examiner*—Paul Thibodeau
*Assistant Examiner*—Sheeba Ahmed
(74) *Attorney, Agent, or Firm*—Armstrong, Westerman & Hattori, LLP

(57) ABSTRACT

To provide a PTFE granular powder containing no filler which has a large apparent density, a small average particle size, a narrow particle size distribution, a small electrostatic charge, a small angle of repose and an excellent powder flowability, and a process for preparing the same. The granular powder is prepared by granulation of a PTFE powder in water with stirring in the presence of an organic liquid forming liquid-liquid interface with water and a nonionic and/or anionic surfactant. A molded article obtained from the granular powder is excellent in tensile strength and elongation and has a small surface roughness, a high electrostatic charge and a high whiteness (Z value).

17 Claims, 4 Drawing Sheets

FILLER-FREE GRANULAR POLYTETRAFLUOROETHYLENE POWDER AND PROCESS FOR PRODUCING THE SAME

TECHNICAL FIELD

The present invention relates to a polytetrafluoroethylene granular powder containing no filler and a preparation process thereof.

BACKGROUND ART

Hitherto many proposals with respect to a process for preparing a granular powder by finely-pulverizing a polytetrafluoroethylene (PTFE) powder prepared through suspension polymerization to an average particle size of less than 100 $\mu$m and then granulating have been made. For example, JP-B-44-22619 discloses a process for stirring and granulating a PTFE powder in an aqueous medium of 30° to 150° C. containing a water-insoluble organic liquid having a boiling point of 30° to 150° C.

In order to improve the process disclosed in the above-mentioned patent publication, JP-B-57-15128 discloses a process in which an equipment having mechanism for pulverizing a PTFE powder is employed.

As a process for granulating by using water only, for example, JP-B-43-8611 discloses a process for granulating in which a PTFE powder is stirred in water of 40° to 90° C., JP-B-47-3187 discloses a process for granulating in which a PTFE powder is stirred in an aqueous medium of not less than 40° C., and further JP-A-3-259926 discloses a process for granulating in which a PTFE powder is stirred in an aqueous medium in combination use of pulverizing mechanism.

However, in such granulation processes, electrostatic charging occurs on the PTFE powder due to static electricity. The electrostatically charged PTFE powder adheres to not only a die mold but also a hopper and feeder due to static electricity at the time of molding, which results in lowering of flowability. Also, there is a tendency that the finer the powder is, the more the flowability and apparent density are lowered. From these points of view, the PTFE powder obtained by the above-mentioned processes is not satisfactory.

Also a granulation process with a roughly pulverized PTFE powder having an average particle size of not less than 100 $\mu$m has been proposed. As the process using a roughly pulverized powder, for example, JIP-A-3-259925 discloses a process for granulating in which a PTFE powder of 420 $\mu$m particle size is stirred in an aqueous medium of 60° to 100° C. in combination use of pulverizing mechanism.

Even by the process disclosed in the above-mentioned patent publication, the obtained PTFE granular powder does not sufficiently satisfy physical properties of a molded article such as tensile strength, and for commercial production, a further step such as a gelling and pulverizing step is required. Also since a molded article obtained by molding the granular powder has a low break down voltage, it cannot be used for applications requiring a high break down voltage. Further as mentioned above, that process requires the pulverizing mechanism.

The present inventors have made intensive studies in view of the above-mentioned problems, and as a result, have found that those problems can be solved by granulating a finely pulverized PTFE powder in the presence of an organic liquid which forms liquid-liquid interface with water, and a nonionic surfactant and/or an anionic surfactant with stirring in water. Also the present inventors have found that the above-mentioned problems can be solved by granulating with stirring in the same manner as above even by using a roughly pulverized PTFE powder.

Namely, an object of the present invention is to provide a PTFE granular powder containing no filler and having a large apparent density, a small average particle size, a narrow particle size distribution, a small electrostatic charge, a small angle of repose and good physical properties such as powder flowability, and a process for preparation thereof. Particularly in case where an average particle size of a PTFE powder as a raw material is small, the obtained PTFE granular powder gives molded products having excellent physical properties such as elongation and surface smoothness, a low surface roughness (smoothness), a large break down voltage and a high degree of whiteness (Z value).

DISCLOSURE OF THE INVENTION

The present invention relates to a process for preparing a PTFE granular powder containing no filler, which is characterized in that a finely pulverized PTFE powder prepared through suspension polymerization and having an average particle size of not less than 10 $\mu$m and less than 100 $\mu$m or a roughly pulverized PTFE powder prepared by suspension polymerization and having an average particle size of not less than 100 $\mu$m and not more than 300 $\mu$m is granulated with stirring in water in the presence of an organic liquid which forms liquid-liquid interface with water, and a nonionic and/or anionic surfactant.

In the above process, it is preferable that the nonionic surfactant is one having a hydrophobic segment comprising a poly(oxyalkylene) unit having 3 or 4 carbon atoms and a hydrophilic segment comprising a poly(oxyethylene) unit.

Also it is preferable that the anionic surfactant is a fluorine-containing surfactant having a perfluoroalkyl group or a perchlorofluoroalkyl group as a hydrophobic group.

It is preferable that an amount of the surfactant is from 0.01 to 10% by weight based on the PTFE powder.

Also as PTFE, in addition to tetrafluoroethylene homopolymer, there can be used a modified PTFE obtained by copolymerizing 99 to 99.999% by mole of tetrafluoroethylene with 1 to 0.001% by mole of perfluoro(vinyl ether).

Further the present invention relates to a PTFE granular powder containing no filler prepared by the above-mentioned process, in which an apparent density of the granular powder is not less than 0.6 g/cm$^3$, particularly not less than 0.7 g/cm$^3$ when a finely pulverized powder having an average particle size of not less than 10 $\mu$m and less than 100 $\mu$m is used as a raw PTFE powder.

As the granular powder, it is preferable that a flowability, angle of repose, average particle size and electrostatic charge of the granular powder which are measured by the methods mentioned hereinafter are not less than 6 times, not more than 40 degrees, not more than 500 $\mu$m and not more than 50 V, respectively.

Also as the granular powder, preferable are one which gives a molded article having a break down voltage of not less than 5 kV in case of a 0.1 mm thick skived sheet, one which gives a molded article having a surface roughness of not more than 4.0 $\mu$m and one which gives a molded article having a whiteness (Z value) of not less than 95, particularly not less than 100.

Particularly preferable are:

a PTFE granular powder containing no filler which has an apparent density of not less than 0.7 g/cm³ and less than 0.8 g/cm³, an average particle size of not less thank 250 μm and less than 500 μm, an angle of repose of not more than 38 degrees and an electrostatic charge of not more than 10 V and gives a molded article having a whiteness (Z value) of not less than 95, preferably not less than 100, a break down voltage of not less than 7 kV in case of a 0.1 mm thick skived sheet and a surface roughness of not more than 2.5 μm;

a PTFE granular powder containing no filler which has an apparent density of not less than 0.8 g/cm³ and less than 0.9 g/cm³, an average particle size of not less than 250 μm and less than 500 μm, an angle of repose of not more than 38 degrees and an electrostatic charge of not more than 10 V and gives a molded article having a whiteness, (Z value) of not less than 95, preferably not less than 100, a break down voltage of not less than 6 kV in case of a 0.1 mm thick skived sheet and a surface roughness of not more than 3.0 μm;

a PTFE granular powder containing no filler which has an apparent density of not less than 0.9 g/cm³ and less than 1.0 g/cm³, an average particle size of not less than 250 μm and less than 500 μm, an angle of repose of not more than 37 degrees and an electrostatic charge of not more than 10 V and gives a molded article having a whiteness (Z value) of not less than 95, preferably not less than 100, a break down voltage of not less than 5 kV in case of a 0.1 mm thick skived sheet and a surface roughness of not more than 3.0 μm;

a PTFE granular powder containing no filler which has an apparent density of not less than 0.7 g/cm³ and less than 0.9 g/cm³, an average particle size of not less than 150 μm and less than 250 μm, an angle of repose of not more than 38 degrees and an electrostatic charge of not more than 10 V and gives a molded article having a whiteness (Z value) of not less than 95, preferably not less than 100, a break down voltage of not less than 7 kV in case of a 0.1 mm thick skived sheet and a surface roughness of not more than 2.5 μm; and a PTFE granular powder containing no filler which has an apparent density of not less than 0.9 g/cm³ and less than 1.0 g/cm³, an average particle size of not less than, 150 μm and less than 250 μm, an angle of repose of not more than 37 degrees and an electrostatic charge of not more than 10 V and gives a molded article having a whiteness (Z value) of not less than 95, preferably not less than 100, a break down voltage of not less than 7 kV in case of a 0.1 mm thick skived sheet and a surface roughness of not more than 3.0 μm.

In general with respect to the PTFE granular powder, the higher the apparent density is and the larger the average particle size is, the more the physical properties relating to handling thereof (angle of repose, flowability, electrostatic charge property, etc.) are enhanced. On the contrary, there is a tendency that the physical properties of the obtained molded article (mechanical strength, elongation, break down voltage, surface roughness, etc.) are lowered.

Though the PTFE granular powder containing no filler of the present invention has a novel excellent handling property and gives a molded article having novel excellent physical properties, in order to identify and evaluate the novel PTFE granular powder of the present invention, it is necessary to compare with granular powders having apparent density and average particle size within the same range, and thus fair evaluation can be obtained.

Therefore, the PTFE granular powders of the present invention are herein identified with apparent density and average particle size thereof.

BEST MODE FOR CARRYING OUT THE INVENTION

Figure 1:
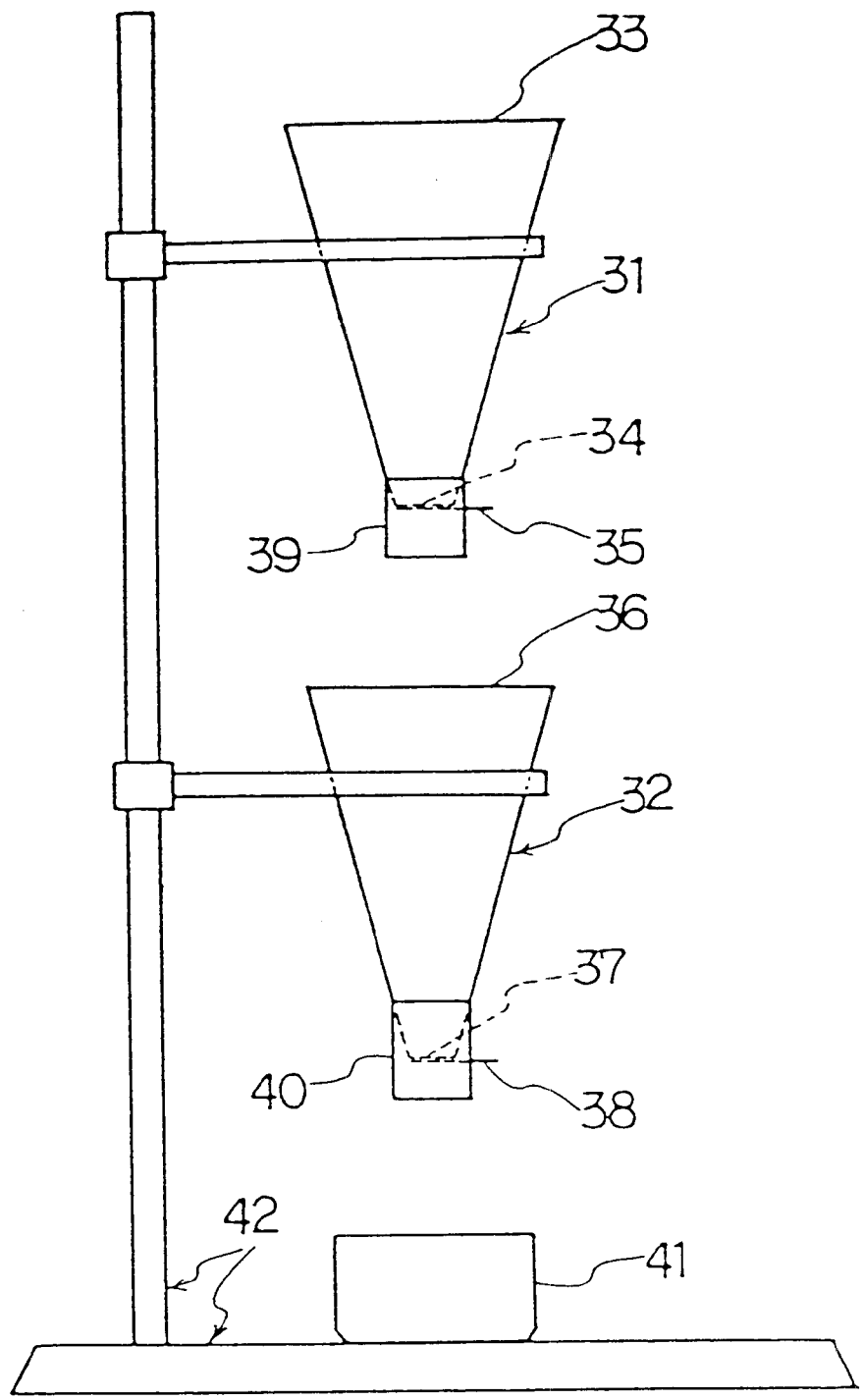
FIG. 1 is a diagrammatic view of an apparatus used for determining flowability of the granular powder in the present invention.

The PTFE powder used in the present invention is prepared by usual suspension polymerization, and preferable is, for example, a powder comprising homopolymer of tetrafluoroethylene (TFE) or a copolymer of TFE and a monomer copolymerizable with TFE. An average particle size after pulverization is not larger than 300 μm preferably not larger than 130 μm, more preferably less than 100 μm, particularly not larger than 50 μm and a lower limit thereof is defined by a pulverizing apparatus and pulverizing technique. The average particle size is usually from 30 to 40 μm.

As the monomer copolymerizable with TFE, there are, for example, a perfluoro(vinyl ether) represented by the formula (I):

$$CF_2=CF-OR_f \qquad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

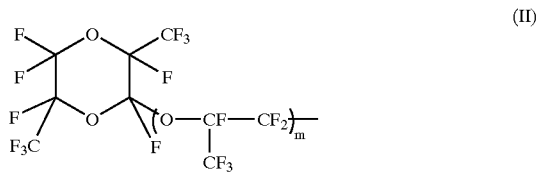

(II)

in which m is 0 or an integer of 1 to 4, or an organic group represented by the formula (III):

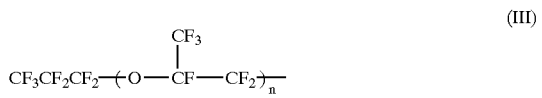

(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an excellent creep resistance can be obtained with maintaining the property of being not-meltprocessable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoints of creep resistance and cost of monomer, perfluoropropyl is preferable.

When a proportion of the monomer copolymerizable with TFE is within the range of 1.0 to 0.001% by mole, an excellent creep resistance can be obtained.

In the present invention, there are used particles obtained by pulverizing the above-mentioned PTFE powder to an average particle size of not larger than 130 μm, preferably less than 100 μm, particularly preferably not larger than 50 μm, for example, in the presence of water or under dry condition by means of a pulverizing machine such as hammer mill, crusher equipped with a rotor having blades, jet mill and impact mill. If the average particle size exceeds 130 μm, as far as it is not more than 300 μm, a granular powder having good powder characteristics can be obtained though a break down voltage is decreased.

The use of those particles having the average particle size in the above-mentioned range gives such effects that the molded articles obtained by molding after the granulation have good physical properties.

The organic liquid forming liquid-liquid interface with water, which is used in the present invention may be an organic liquid capable of forming a liquid-liquid interface with water and being present as droplets in water or may be one which dissolves somewhat in water if it is capable of forming droplets in water and a liquid-liquid interface with water. Examples thereof are, for instance, alcohols such as 1-butanol and 1-pentanol; ethers such as diethyl ether and dipropyl ether; ketones such as methyl ethyl ketone and 2-pentanone; aliphatic hydrocarbons such as pentane, cyclohexane and dodecane; aromatic hydrocarbons such as benzene, toluene and xylene; halogenated hydrocarbons such as methylene chloride, tetrafluoroethylene, trichloroethylene, chloroform, chlorobenzene, trichlorotrifluoroethane, monofluorotrichloromethane, difluorotetrachloroethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane; and the like. Among them, the halogenated hydrocarbons are preferable, land particularly preferable are chlorinated- and fluorochlorinated-hydrocarbons such as methylene chloride, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane. Those are nonflammable and satisfy requirements for flon restrictions. Those organic liquids may be used solely or in combination use of two or more thereof.

An amount of the above-mentioned liquid-liquid interface-forming organic liquid is 30 to 90% (% by weight, hereinafter the same), preferably 50 to 80% on the basis of the PTFE powder.

In the present invention, it appears that the granulation of the PTFE powder is conducted in the droplets of the above-mentioned liquid-liquid interface-forming organic liquid and that, since the droplets of the liquid become smaller and more approximate to a spherical form because of functioning of nonionic and/or anionic surfactants, particles having a smaller average particle size and a form near sphere can be obtained, and an apparent density of the granular powder is increased.

Examples of the above-mentioned nonionic surfactant are, for instance, polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamine, segmented polyalkylene glycols having a hydrophobic segment comprising poly(oxyalkylene) unit having 3 or 4 carbon atoms and a hydrophilic segment comprising poly(oxyethylene) unit, the derivatives thereof, and the like.

More particularly, examples of the polyoxyethylamine oxides are dimethyloxyethylamine oxide and the like.

Examples of the alkylamine oxides are dimethyllaurylamine oxide, dimethyloleylamine oxide and the like.

Examples of the polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like.

Examples of the polyoxyethylene alkyl phenyl ethers are polyoxyethylene nonyl phenyl ether, polyoxyethylene octyl phenyl ether and the like.

Examples of the polyoxyethylene fatty acid esters are polyoxyethylene monolauric acid ester, polyoxyethylene monooleic acid ester, polyoxyethylene monostearic acid ester and the like.

Examples of the sorbitan fatty acid esters are sorbitan monolauric acid ester, sorbitan monopalmitic acid ester, sorbitan monostearic acid ester, sorbitan monooleic acid ester and the like.

Examples of the polyoxyethylene sorbitan fatty acid esters are polyoxyethylene sorbitan monolauric acid ester, polyoxyethylene sorbitan monopalmitic acid ester, polyoxyethylene sorbitan monostearic acid ester and the like.

Examples of the glycerine esters are monomyristic acid glyceryl, monostearic acid glyceryl, monooleic lacid glyceryl and the like.

Examples of the derivatives of the above surfactants are, for example, polyoxyethylene alkyl phenyl-formaldehyde condensate, polyoxyethylene alkyl ether phosphate and the like.

As the segmented polyalkylene glycols having a hydrophobic segment and hydrophilic segment, preferable are, for example, those represented by the formula (IV):

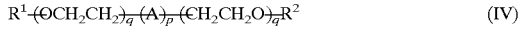

wherein A is

$R^1$ and $R^2$ are the same or different and each is hydrogen atom, $-CH_3$, $-C_2H_5$, $-C_3H_7$, $-C_4H_9$ or $-CH_2CH=CH_2$, p is an integer of 5 to 200, q is an integer of 2 to 400. From the viewpoint of being easily adsorbed in the PTFE resin, it is preferable that each of $R^1$ and $R^2$ is hydrogen atom, p is from 15 to 40 and q is from 7 to 100.

Among them, preferable are the amine oxides, the segmented polyalkylene glycol and the polyoxyethylene alkyl phenyl ethers, and more preferable are polyoxyethylamine oxide and

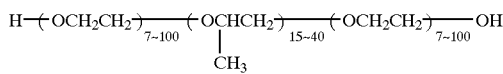

An amount of the above-mentioned nonionic surfactant is from 0.01 to 5%, preferably from 0.02 to 0.1% on the basis of the PTFE powder.

By using the nonionic surfactant in the above-mentioned range, there can be obtained a granular powder being in the spherical form and having a small particle size, a narrow particle size distribution, an excellent powder flowability and a large apparent density.

In the present invention, as the surfactant, the anionic surfactant may be used alone or in combination use of the nonionic surfactant. When the anionic surfactant is used alone, its amount is from 0.01 to 5% based on the PTFE powder. In case of the combination use of the anionic surfactant with the nonionic surfactant, the amount of the anionic surfactant is from 0.001 to 5% based on the PTFE powder. (In case of the combination use, the amount of the nonionic surfactant is the same as mentioned above.)

As the anionic surfactant, there can be used known ones, for example, higher fatty acid and its salt, alkyl sulfate, alkyl sulfonate, alkyl aryl sulfonate, alkyl phosphoric acid ester and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (V):

$$X(CF_2CF_2)_n(CH_2)_mA \tag{V}$$

or the formula (VI):

$$X(CF_2CFCl)_n(CH_2)_mA \tag{VI}$$

wherein X is hydrogen, fluorine atom or chlorine atom, n is an integer of 3 to 10, m is 0 or an integer of 1 to 4, A is carboxyl group, sulfonic acid group or an alkali metal or ammonium residue thereof.

The PTFE granular powder of the present invention containing no filler is prepared, for example, by a method mentioned below, but the method is not limited thereto.

(1) A 200-liter granulation tank equipped with cone blades is charged with 120 to 150 liters of deionized water and a temperature inside the tank is adjusted to 20° to 28° C.

(2) Then the tank is charged with 30 kg of the previously, pulverized PTFE powder.

(3) A given amount of the surfactant is added with rotating the cone blades at 400 rpm. Two to three minutes after the addition, a given amount of the above-mentioned organic liquid is added.

(4) The stirring is continued at 400 rpm is for five minutes to make the organic liquid and PTFE powder being compatible with each other.

(5) A mixture in the tank is taken out of the tank to pass through a line mixer for external circulation for ten minutes.

(6) The inside temperature of the granulation tank is increased to 37° to 39° C. over 15 to 30 minutes. This temperature is optionally changed depending on aimed quality of a granulate.

(7) The inside temperature of the tank is kept at 37° to 39° C. for 15 to 60 minutes to distill off the organic liquid. During that period of time, the number of rotations of the cone blade is 400 rpm. That period of time is optionally changed depending on aimed quality of a granulate.

(8) The granulate is separated from water with a 150 mesh sieve after the stirring is stopped.

(9) The separated granulate is dried at 165° C. for 20 hours with a box type hot air circulating dryer.

In case of the granulation by using a powder having an average particle size of not less than 10 μm and less than 100 μm or a powder having a particle size of not more than 130 μm when an average particle size thereof is not less than 100 μm, the process of the present invention can give, for example, a PTFE granular powder containing no filler, which has physical properties mentioned hereinbelow and provides molded products with physical properties described hereinbelow. Particularly since the particle size distribution is narrow, an additional step of taking out particles of a small size with a sieve like a conventional method is not necessary. Thus, the PTFE granular powder which cannot be prepared by a conventional process can be prepared.

Physical Properties of PTFE Granular Powder Containing no Filler

Apparent density: not less than 0.7 g/cm³
When less than 0.7 g/cm³, an amount of powder to be filled in a die is small.

Flowability: not less than 6 times
When not more than 5.5 times, flowability in a hopper is not so good. Particularly 8 times is preferable.

Angle of Repose: not more than 40 degrees
The powder having an angle of repose exceeding 40 degrees is not preferable because its flowability is not good. Particularly an angle of repose of not more than 38 degrees is preferable.

The angle of repose is not more than 38 degrees when the apparent density is not less than 0.7 g/cm³ and less than 0.9 g/cm³, and is not more than 37 degrees when the apparent density is not less than 0.9 g/cm³ and less than 1.0 g/cm³.

An angle of repose of a powder is affected by a gravity and becomes smaller as an apparent density becomes higher. Accordingly, the granular powder obtained by the granulation method of the present invention changes its angle of repose depending on its apparent density. The powders of the present invention have smaller angle of repose than that of granular powders obtained by conventional techniques.

The angle of repose of the powders obtained by the conventional techniques is more than 40 degrees when the apparent density is not less than 0.6 g/cm³ and less than 0.9 g/cm³, more than 38 degrees when the apparent density is not less than 0.9 g/cm³ and less than 1.0 g/cm³ and more than 36 degrees when the apparent density is not less than 1.0 g/cm³.

Particle Size Distribution A:
Granular powder remaining on a 10 mesh sieve: 0%
Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle Size Distribution B: not less than 50% by weight
The granular powder having the particle seize distribution mentioned above after granulated is preferable because it is filled uniformly in the die. Particularly not less than 60% by weight is preferable.

Average Particle Size: not more than 500 μm
When larger than 500 μm, the powder cannot be filled in the thin-walled die. Particularly preferable is from 150 to 400 μm from the viewpoint of filling the powder in the thin-walled die.

Electrostatic Charge: not more than 50 V
A PTFE powder having an electrostatic charge exceeding 50 V adheres to not only a die but also a hopper and feeder due to static electricity at the time of molding, which results in lowering of flowability. A preferable amount is not more than 10 V. In such an amount, the above-mentioned problem does not occur at all.

Physical Properties of Molded Article

Tensile Strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined in that range depending on its application.

Elongation: not less than 100%

When less than 100%, there is a case where the molded article is cut when mounted on an equipment or processed. Preferable elongation is not less than 150%.

Surface Roughness: not larger than 3.0 μm

The molded article having a surface roughness larger than 3.0 μm is not preferable because that roughness is larger than desired. Particularly preferable surface roughness is not larger than 2.5 μm, preferably not larger than 2.0 μm.

Break Down Voltage: not less than 5 kV

Break down voltage is a characteristic required when a powder is used for a high voltage insulating material such as an insulating tape for condenser for high voltage transformer or an insulating nozzle for circuit breaker. The break down voltage is preferably not less than 7 kV, particularly not less than 10 kV.

Whiteness (Z Value): not less than 95

A PTFE molded article has a higher whiteness as compared with usual resins. From the commercial viewpoint, a higher whiteness is preferred. Preferable whiteness is not less than 100.

The methods of measuring each physical property are described hereinbelow.

Apparent Density: Measured in accordance with JIS K 6891-5.3

Average Particle Size After Pulverization (Primary Particle Size):

Wet sieve method: JIS standard sieves of 20 mesh (sieve opening: 840 μm), 250 mesh (sieve opening: 62 μm), 270 mesh (sieve opening: 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m$^2$ for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated percentages 50($d_{50}$) and 84($d_{34}$) are read, and wet sieve size ($d_{ws}$) is calculated by the following equation.

$$\log_e d_{ws} = \log_e d_{50} - \frac{1}{2}\left(\log_e \frac{d_{34}}{d_{50}}\right)^2$$

Flowability: Measured in accordance with the method described in JP-A-3-259925.

Figure 3:
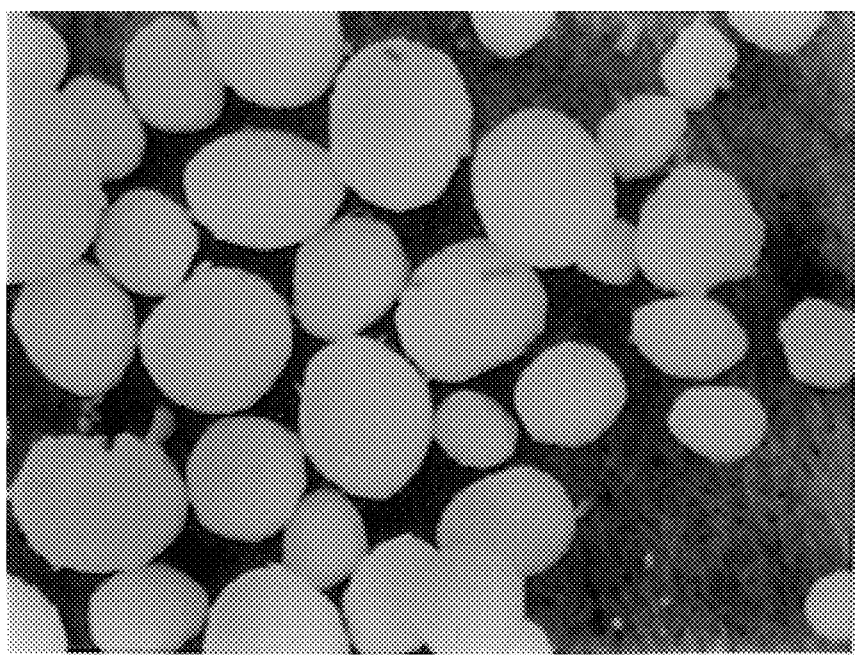
FIG. 3 is an optical microscopic photograph (magnification: ×100) showing a structure of particles in the PTFE granular powder of the present invention containing no filler, which was obtained in Example 7.

Namely, there is used a measuring device comprising a support base 42 and an upper hopper 31 and a lower hopper 32, the both of which are aligned on their center lines and supported on the support base 42 as shown in FIG. 1 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34. is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper flare adjusted so that the distance between the both partition plates is 15 cm. In FIG. 1, the numerals 39 and 40 indicate outlet covers of each hopper, and the numeral 41 indicates a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. After the powder has dropped completely into the lower hopper 32, the dropped powder is allowed to stand for 15±2 seconds, and then the partition plate 38 of the lower hopper is pulled out to see whether the powder is dropped or not from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good." In case where the powder is never dropped, the flowability of the powder is estimated to be "Not good." In case where in three series of the dropping test, the powder has been dropped only one time, the dropping test is further conducted twice, and when the two series of the dropping test are both satisfactory, the flowability is estimated to be "Good." In other cases, the flowability is estimated to be "Not good."

(III) With respect to the powder estimated to, be "Good," the upper hopper is charged with two cups of powder by using the same 30 cc cup, and the dropping test of the powder is conducted in the same manner as above. When as a result, the flowability is estimated to be "Good," the number of cups filled with the powder is increased successively and the dropping test is continued until the flowability is estimated to be "Not good." The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average Particle Size and Particle Size Distribution A of Granular Powder:

Standard sieves of 10, 20, 32, 48, 60 and 83 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Also percents by weight of the granular powder remaining on each sieve of 10, 20, 32, 48, 60 and 83 meshes are regarded as the particle size distribution A.

Particle Size Distribution B:

The particle size distribution B is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Electrostatic Charge: Handy Electrostatic Meter SFM775 available from Ion Systems, Inc. is used to determine an electrostatic charge.

Tensile Strength (Hereinafter may be Referred to as "TS") and Elongation (Hereinafter may be Referred to as "EL"):

A die having an inner diameter of 100 mm is charged with 25 g of powder, and a pressure is applied gradually over about 30 seconds until the final pressure becomes about 300 kg/cm$^2$. Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Angle of Repose:

Measured with Powder Tester available from Hosokawa Micron Co., Ltd.

Surface Roughness:

A 50 mm diameter die mold is charged with 210 g of powders and maintained for five minutes at a molding pressure of 300 kg/cm$^2$. The obtained pre-molded article is heated up from room temperature to 365° C. at a heating rate of 50° C./hr. After maintained at 365° C. for 5.5 hours, the pre-molded article is cooled at a cooling rate of 50° C./hr. The top surface of the obtained molded article is measured according to the center line average roughness ($R_a$) method described in JIS B 0601 by using a surface roughness measuring device available from Tokyo Seimitsu Kikai Kabushiki Kaisha.

Break Down Voltage:

A block of a molded article which is produced in the same manner as for measurement of the Z value is cut to give a 0.1 mm thick skived sheet. The break down voltage is measured by using the obtained skived sheet according to JIS K 6891.

Z Value:

A 50 mm diameter die was filled with 200 g of a granular powder and then maintained at a molding pressure of 300 kg/cm$^2$ for five minutes. The obtained pre-molded article (diameter: about 50 mm, thickness: 50 mm) as heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (at its center portion). Then a Z value on the center of the cut portion was measured by the Z value measuring method of the XYZ calorimetric system of Commission International de Leclairage.

The preferred proportion of each component for preparing the PTFE granular powder of the present invention containing no filler is, for example, as follows:

| | |
|---|---|
| PTFE powder | 100 parts |
| Nonionic and/or anionic surfactants (on the basis of the PTFE powder) | 0.01 to 5% by weight |
| Liquid-liquid interface-forming organic liquid | 30 to 90 parts |

The PTFE granular powder containing no filler and prepared from those components in the proportion mentioned above is advantageous from the viewpoint of a large apparent density, a small angle of repose and good flowability. More preferable are the components mentioned below.

| | |
|---|---|
| PTFE powder (average particle size after granulation: not more than 130 μm, particularly less than 100 μm) | 100 parts |
| Nonionic surfactant (on the basis of the PTFE powder) | 0.02 to 1.0% by weight |
| Liquid-liquid interface-forming organic liquid | 50 to 80 parts |

The PTFE granular powder containing no filler and prepared from those components in the proportion mentioned above is advantageous from the viewpoint of a small average particle size and a narrow particle size distribution and from such a point that a surface roughness of a molded article obtained from the granular powder is small.

The present invention is then explained by means of Examples, but is not limited thereto.

EXAMPLE 1

A 200-liter granulation tank equipped with cone blades was charged with 120 to 150 liters of deionized water, and a temperature of the tank was adjusted to 20° to 28° C. Then, the tank was charged with 30 kg of a PTFE powder (TFE homopolymer, i.e. POLYFLON TFE molding powder M-12 available from Daikin Industries, Ltd.) prepared by suspension polymerization and pulverized to an average particle size of 34 μm. A nonionic surfactant (Puronon #208 represented by:

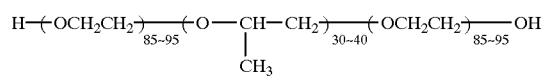

and available from Nippon Yushi Kabushiki Kaisha) was then added in an amount of 0.100% with rotating the cone blades at 400 rpm. Two to three minutes after, 19.1 kg of CH$_2$Cl$_2$ was added as an organic liquid. Subsequently after stirring at 400 rpm for five minutes to make the organic liquid compatible with the PTFE powder, the mixture in the tank was fed to a line mixer outside the tank for external circulation for 10 minutes. The inside of the tank was heated up to 37° to 39° C. over 15 minutes and maintained at that temperature for 15 minutes to distill off the organic liquid. During that period of time, the rotation of the cone blades was maintained at 400 rpm.

After stopping the stirring, granulates were separated from water by using a 150 mesh sieve, and the sieved granulates were dried at 165° C. for 20 hours with a box type hot air circulating dryer to give a granular powder of the present invention.

Physical properties of the obtained PTFE granular powder containing no filler and a molded article obtained from the powder were determined by the methods mentioned above.

The results are shown in Table 1.

EXAMPLES 2 TO 11

The same procedures as in Example 1 were repeated except that there were employed the amounts and kinds of the surfactant, the period of time for maintaining at 37° to 39° C. and the amount of the organic liquid forming a liquid-liquid interface with water, which are shown in Table 1, to give a PTFE granular powder of the present invention containing no filler. The same tests as in Example 1 were carried out. The results thereof are shown in Table 1.

The nonionic surfactant used in Example 4 and the anionic surfactant used in Examples 8 and 9 are those mentioned below, respectively.

Puronon #104:

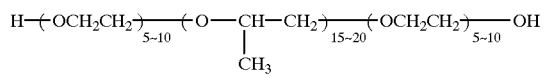

available from Nippon Yushi Kabushiki Kaisha and

DS-101: Anionic surfactant available from Daikin Industries, Ltd., an aqueous ammonium solution of a perfluorooctanoic acid.

Also, with respect to the PTFE granular powder obtained in Example 7 which contains no filler, the photographs of the particles in the powder were taken in the following way.

Shape of Particle: By using a Video Microscope of optical microscope available from SONY, Corporation, photographs were taken at ×100 magnification and ×200 magnification.

Figure 2:
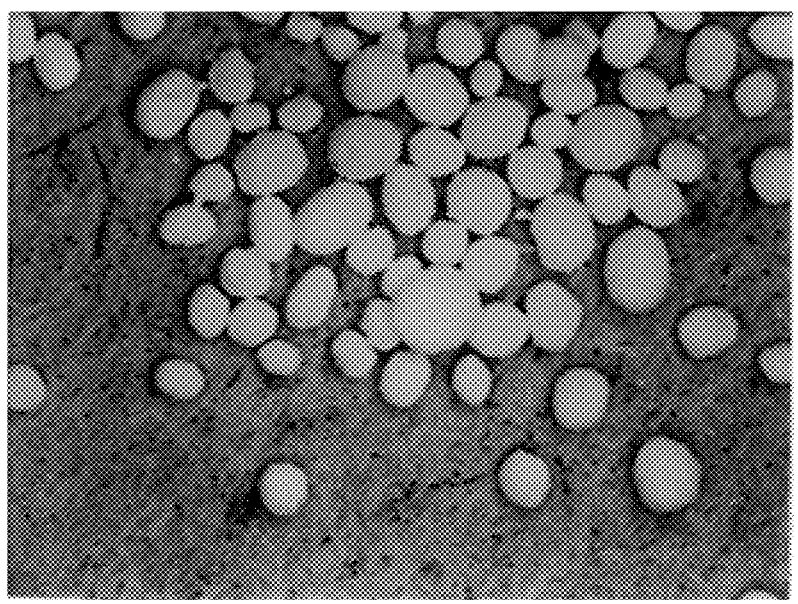
FIG. 2 is an optical microscopic photograph (magnification: ×200) showing a structure of particles in the PTFE granular powder of the present invention containing no filler, which was obtained in Example 7.

The results are shown in FIGS. 2 and 3.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Conditions of preparation | | | | | | | | | | | |
| PTFE powder | M-12 | M-12 | M-12 | M-12 | M-12 | M-12 | M-12 | M-12 | M-12 | M-12 | M-12 |
| Average particle size after pulverization ($\mu$m) | 34 | 34 | 34 | 34 | 34 | 34 | 34 | 34 | 34 | 34 | 34 |
| Surfactant (kind) | Puronon #208 | Puronon #208 | Puronon #208 | Puronon #104 | Puronon #208 | Puronon #208 | Puronon #208 | DS-101 | DS-101 Puronon #208 | Puronon #208 | Puronon #208 |
| Surfactant (% by weight based on PTFE) | 0.100 | 0.025 | 0.010 | 0.010 | 0.025 | 0.025 | 0.025 | 0.100 | 0.001+ 0.025 | 0.001 | 0.025 |
| Liquid-liquid interface-forming organic liquid (kg) | 19.1 | 19.1 | 19.1 | 19.1 | 21.0 | 23.0 | 23.0 | 19.1 | 19.1 | 19.1 | 20.0 |
| Period of time for maintaining at 37° to 39° C. (min) | 15 | 15 | 15 | 15 | 15 | 15 | 60 | 15 | 60 | 60 | 90 |
| Physical properties of granular powder | | | | | | | | | | | |
| Apparent density (g/cm$^3$) | 0.805 | 0.801 | 0.833 | 0.796 | 0.853 | 0.773 | 0.897 | 0.820 | 0.883 | 0.902 | 0.912 |
| Flowability | 6 | 6 | 6 | 7 | 8 | 8 | 8 | 6 | 8 | 8 | 8 |
| Angle of repose (degree) | 37.4 | 36.4 | 36.4 | 35.7 | 36.8 | 36.1 | 36.5 | 37.4 | 35.4 | 35.7 | 35.4 |
| Electrostatic charge (V) | 0 | 0 | 0 | 0 | 0 | 0 | 0 | 30 | 0 | 0 | 0 |
| Particle size distribution A (% by weight) | | | | | | | | | | | |
| 10 on | 0.0 | 0.0 | 0.0 | 0.0 | 0.0 | 0.0 | 0.0 | 0.0 | 0.0 | 0.0 | 0.0 |
| 20 on | 0.0 | 0.0 | 0.2 | 0.0 | 0.0 | 0.0 | 0.0 | 0.5 | 0.0 | 0.0 | 0.0 |
| 32 on | 0.6 | 2.2 | 8.4 | 1.6 | 3.0 | 10.0 | 2.0 | 8.7 | 1.5 | 6.1 | 3.0 |
| 48 on | 9.0 | 18.4 | 14.0 | 17.6 | 37.4 | 68.4 | 54.4 | 13.3 | 48.0 | 14.1 | 22.4 |
| 60 on | 12.2 | 16.6 | 21.8 | 19.6 | 22.4 | 12.4 | 20.4 | 24.3 | 19.0 | 21.2 | 22.2 |
| 83 on | 39.9 | 35.6 | 27.6 | 35.4 | 25.0 | 7.6 | 17.6 | 26.1 | 24.1 | 30.0 | 30.7 |
| 83 pass | 38.6 | 27.2 | 28.0 | 25.8 | 12.2 | 1.6 | 5.6 | 27.1 | 7.4 | 28.3 | 21.9 |
| Particle size distribution B (% by weight) | 50.1 | 53.2 | 52.0 | 56.8 | 53.2 | 74.6 | 58.7 | 52.7 | 53.9 | 54.2 | 55.8 |
| Average particle size after granulation ($\mu$m) | 200 | 220 | 240 | 200 | 280 | 400 | 320 | 240 | 300 | 240 | 240 |
| Physical properties of molded article | | | | | | | | | | | |
| TS (kg/cm$^2$G) | 380 | 400 | 390 | 400 | 390 | 390 | 360 | 390 | 350 | 390 | 380 |
| EL (%) | 390 | 410 | 380 | 390 | 380 | 380 | 440 | 380 | 370 | 380 | 380 |
| Surface roughness ($\mu$m) | 1.7 | 2.0 | 2.1 | 2.4 | 2.3 | 2.3 | 2.8 | 2.3 | 2.1 | 2.2 | 2.3 |
| Whiteness (Z value) | 109 | 110 | 107 | 110 | 110 | 110 | 110 | 111 | 110 | 110 | 110 |
| Break down voltage (kV) | 7.7 | 8.3 | 8.2 | 8.8 | 7.8 | 8.3 | 6.2 | 7.2 | 5.0 | 8.2 | 7.8 |

In the column of the particle size distribution A of Table 1, 10 on, 20 on, 32 on, 48 on, 60 on and 83 on indicate the percentages of particles remaining on the 10 mesh, 20 mesh, 32 mesh, 48 mesh, 60 mesh and 83 mesh sieves, respectively. And, 83 pass represents the percentage of the particles passed through the 83 mesh sieve.

COMPARATIVE EXAMPLES 1 TO 3

The same procedures as in Example 1 were repeated except that there was not employed the nonionic surfactant, to give a PTFE granular powder containing no filler. The same tests as in Example 1 were carried out. With respect to Comparative Example 1, a photograph was taken in the same manner as in Example 7. The results are shown in Table 2 and FIG. 4.

TABLE 2

|  | Com. Ex. 1 | Com. Ex. 2 | Com. Ex. 3 |
|---|---|---|---|
| Conditions of preparation |  |  |  |
| PTFE powder | M-12 | M-12 | M-12 |
| Average particle size after pulverization ($\mu$m) | 34 | 34 | 34 |
| Surfactant (kind) | — | — | — |
| Surfactant (% by weight based on PTFE) | — | — | — |
| Liquid-liquid interface-forming organic liquid (kg) | 21.0 | 23.0 | 19.1 |
| Period of time for maintaining at 37° to 39° C. (min) | 15 | 15 | 15 |
| Physical properties of granular powder |  |  |  |
| Apparent density (g/cm$^3$) | 0.800 | 0.720 | 0.830 |
| Flowability | 4 | 8 | 6.5 |
| Angle of repose (degree) | 38.7 | 40.6 | 38 |
| Electrostatic charge (V) | 300 | 330 | 330 |
| Particle size distribution A (% by weight) |  |  |  |
| 10 on | 0.5 | 3.0 | 0.0 |
| 20 on | 9.0 | 27.7 | 0.0 |
| 32 on | 57.3 | 57.9 | 7.2 |
| 48 on | 29.6 | 12.5 | 45.7 |
| 60 on | 1.9 | 0.8 | 19.4 |
| 83 on | 0.7 | 0.3 | 20.6 |
| 83 pass | 1.0 | 0.5 | 6.9 |
| Particle size distribution B (% by weight) | 58.8 | 58.9 | 47.1 |
| Average particle size after granulation ($\mu$m) | 600 | 720 | 320 |
| Physical properties of molded article |  |  |  |
| TS (kg/cm$^2$G) | 450 | 460 | 376 |
| EL (%) | 350 | 360 | 341 |
| Surface roughness ($\mu$m) | 2.7 | 2.2 | 2.3 |
| Whiteness (Z value) | 110 | 111 | 107 |
| Break down voltage (kV) | 5.3 | 6.2 | 4.7 |

As is evident from the results in Tables 1 and 2, the PTFE granular powder containing no filler which is obtained by the preparation process of the present invention has a large apparent density, particularly a small particle size, a narrow particle size distribution, a small electrostatic charge and a superior flowability in spite of the small particle size. Also, the molded article obtained from the granular powder is superior in tensile strength and elongation and has a low surface roughness, a high break down voltage and a high whiteness (Z value).

Also, it is recognized that according to the preparation process of the present invention, the average particle size and the particle size distribution of the PTFE granular powder can be controlled by an addition amount of the surfactant.

Figure 4:
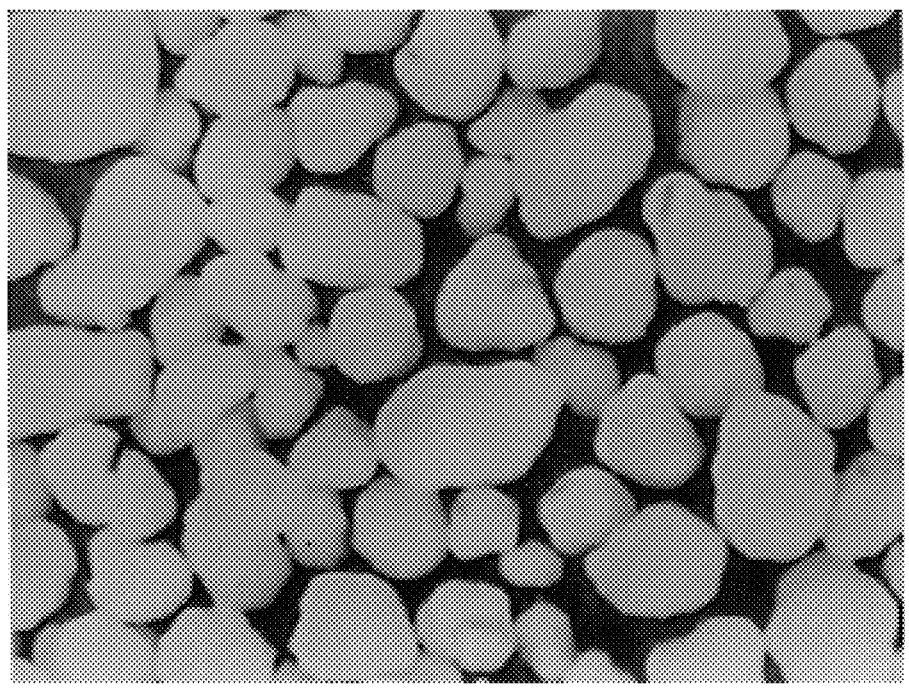
FIG. 4 is an optical microscopic photograph (magnification: ×100) showing a structure of particles in the PTFE granular powder containing no filler, which was obtained in Comparative Example 1.

FIGS. 2 and 3 are optical microscopic photographs of Example 7, which show the structure of the particle in the PTFE granular powders of the present invention. FIG. 4 is an optical microscopic photograph which shows the structure of the particle in the PTFE granular powders obtained according to a conventional granulation process without using a surfactant (Comparative Example 1).

As is evident from these Figures, though the particles in the PTFE granular powder of the present invention are almost spherical, the particles in the PTFE granular powder obtained according to the above-mentioned conventional granulation process is not spherical. Also, the particles in the PTFE granular powder of the present invention are significantly smaller than the particles in the PTFE granular powder containing no filler, which is obtained according to the above-mentioned conventional granulation process.

The reason why the PTFE granular powder of the present invention is superior in powder flowability in spite of the small average particle size seems that, for example, the shape of the particles are almost spherical as mentioned above.

EXAMPLES 12 TO 16

The same procedures as in Example 1 were repeated except that there were employed the PTFE powder (POLYFLON TFE molding powder M-111 available from Daikin Industries, Ltd., modified PTFE with which a small amount of perfluoro(vinyl ether) was copolymerized) having an average particle size after granulation of 30 $\mu$m (Examples 12 to 14), 117 $\mu$m (Example 15) and 120 $\mu$m (Example 16), a period of time for maintaining at 37° to 39° C. and amounts and kinds of the nonionic surfactant and the liquid-liquid interface-forming organic liquid (dichloromethane in Examples 12 to 15 and cyclohexane in Example 16) which are all shown in Table 3, to give a PTFE granular powdery of the present invention containing no filler. The same tests as in Example 1 were carried out, and the results thereof are shown in Table 3.

COMPARATIVE EXAMPLE 4

The same procedures as in Example 15 were repeated except that the modified PTFE (POLYFLON TFE molding powder M-111, average particle size after granulation: 116 $\mu$m) was used and that there was not employed the surfactant, to give a PTFE granular powder containing no filler. The same tests as in Example 1 were carried out. The results are shown in Table 3.

TABLE 3

|  | Ex. 12 | Ex. 13 | Ex. 14 | Ex. 15 | Ex. 16 | Com. Ex. 4 |
|---|---|---|---|---|---|---|
| Conditions of preparation |  |  |  |  |  |  |
| Modified PTFE powder | M-111 | M-111 | M-111 | M-111 | M-111 | M-111 |
| Average particle size after pulverization ($\mu$m) | 30 | 30 | 30 | 117 | 120 | 116 |
| Surfactant (kind) | Puronon #104 | Puronon #208 | Puronon #104 | Puronon #104 | Puronon #104 | — |
| Surfactant (% by weight based on PTFE) | 0.01 | 0.025 | 0.025 | 0.025 | 0.025 | — |
| Liquid-liquid interface-forming organic liquid (kg) | 19.1 | 19.1 | 18.0 | 18.1 | 17.1 *1) | 18.1 |

TABLE 3-continued

|  | Ex. 12 | Ex. 13 | Ex. 14 | Ex. 15 | Ex. 16 | Com. Ex. 4 |
|---|---|---|---|---|---|---|
| Period of time for maintaining at 37° to 39° C. (min) | 15 | 60 | 30 | 15 | 15 | 15 |
| Physical properties of granular powder |  |  |  |  |  |  |
| Apparent density (g/cm$^3$) | 0.846 | 0.901 | 0.900 | 0.762 | 0.819 | 0.750 |
| Flowability | 8 | 8 | 8 | 8 | 8 | 8 |
| Angle of repose (degree) | 36.5 | 35.6 | 35.6 | 36.7 | 35.5 | 36.9 |
| Electrostatic charge (V) | 0 | 0 | 0 | 0 | 0 | 150 |
| Particle size distribution A (% by weight) |  |  |  |  |  |  |
| 10 on | 0.0 | 0.0 | 0.0 | 0.0 | 0.0 | 0.0 |
| 20 on | 1.2 | 1.4 | 0.0 | 0.9 | 1.0 | 1.7 |
| 32 on | 11.4 | 14.4 | 0.1 | 24.2 | 25.4 | 34.9 |
| 48 on | 14.2 | 29 | 16.2 | 35.4 | 35.7 | 22.6 |
| 60 on | 28.6 | 15.6 | 18.9 | 13.4 | 13.5 | 14.5 |
| 83 on | 26.8 | 24.4 | 41.9 | 11.6 | 9.9 | 10.9 |
| 83 pass | 17.8 | 15.2 | 22.9 | 14.5 | 14.6 | 15.4 |
| Particle size distribution B (% by weight) | 56.6 | 54.0 | 61.2 | 42.6 | 43.2 | 31.7 |
| Average particle size after granulation (μm) | 260 | 270 | 220 | 360 | 370 | 380 |
| Physical properties of molded article |  |  |  |  |  |  |
| TS (kg/cm$^2$G) | 420 | 390 | 440 | 358 | 362 | 345 |
| EL (%) | 420 | 390 | 440 | 403 | 406 | 395 |
| Surface roughness (μm) | 2.4 | 3.0 | 2.8 | 2.0 | 2.0 | 2.2 |
| Whiteness (Z value) | 103 | 103 | 101 | 105 | 105 | 104 |
| Break down voltage (kV) | 12.3 | 11.3 | 13.1 | 7.2 | 8.6 | 6.9 |

*1) Cyclohexane was used as the organic liquid.

As is evident from Table 3, even the modified PTFE can make an apparent density of a granular powder larger and make an electrostatic charge zero, and molded articles obtained from the granular powder have an excellent tensile strength and elongation and a break down voltage of not less than 7 V. Particularly in case where an average particle size of a raw modified PTFE powder after pulverizing is not more than 130 μm, particularly less than 100 μm, the obtained granular powder has a small particle size, a narrow particle size distribution and excellent flowability in spite of the small particle size.

EXAMPLES 17 TO 20 AND COMPARATIVE EXAMPLES 5 AND 6

The same procedures as in Example 12 were repeated except that a raw modified PTFE powder land preparation conditions which are shown in Table 4 were employed, to give a PTFE granular powder containing no filler. The same tests as in Example 1 were carried out, and the results are shown in Table 4.

TABLE 4

|  | Ex. 17 | Ex. 18 | Ex. 19 | Ex. 20 | Com. Ex. 5 | Com. Ex. 6 |
|---|---|---|---|---|---|---|
| Conditions of preparation |  |  |  |  |  |  |
| Modified PTFE powder | M-111 | M-111 | M-111 | M-111 | M-111 | M-111 |
| Average particle size after pulverization (μm) | 153 | 155 | 280 | 282 | 152 | 280 |
| Surfactant (kind) | Puronon #104 | Puronon #104 | Puronon #104 | Puronon #104 | — | — |
| Surfactant (% by weight based on PTFE) | 0.025 | 0.025 | 0.025 | 0.025 | — | — |
| Liquid-liquid interface-forming organic liquid (kg) | Dichloromethane (18.1) | Cyclohexane (17.1) | Dichloromethane (18.1) | Cyclohexane (17.1) | Dichloromethane (18.1) | Dichloromethane (18.1) |
| Period of time for maintaining at 37° to 39° C. (min) | 15 | 15 | 15 | 15 | 15 | 15 |
| Physical properties of granular powder |  |  |  |  |  |  |
| Apparent density (g/cm$^3$) | 0.797 | 0.837 | 0.793 | 0.802 | 0.780 | 0.780 |
| Flowability | 8 | 8 | 8 | 8 | 8 | 8 |
| Angle of repose (degree) | 35.9 | 35.1 | 36.2 | 35.9 | 36.7 | 36.7 |
| Electrostatic charge (V) | 0 | 0 | 0 | 0 | 130 | 90 |
| Particle size distribution A (% by weight) |  |  |  |  |  |  |
| 10 on | 0.0 | 0.0 | 0.0 | 0.0 | 0.0 | 0.0 |
| 20 on | 1.2 | 0.8 | 0.2 | 0.1 | 1.8 | 0.9 |

TABLE 4-continued

|  | Ex. 17 | Ex. 18 | Ex. 19 | Ex. 20 | Com. Ex. 5 | Com. Ex. 6 |
|---|---|---|---|---|---|---|
| 32 on | 24.7 | 23.2 | 15.0 | 16.2 | 35.6 | 28.8 |
| 48 on | 36.6 | 36.9 | 36.6 | 35.5 | 22.7 | 24.3 |
| 60 on | 13.8 | 13.9 | 13.8 | 14.8 | 14.2 | 14.4 |
| 83 on | 10.1 | 10.1 | 13.0 | 14.0 | 10.7 | 13.5 |
| 83 pass | 13.6 | 15.1 | 18.0 | 19.4 | 15.1 | 18.0 |
| Particle size distribution B (% by weight) | 44.3 | 44.3 | 41.2 | 39.7 | 31.2 | 33.8 |
| Average particle size after granulation ($\mu$m) | 370 | 360 | 320 | 310 | 390 | 330 |
| Physical properties of molded article |  |  |  |  |  |  |
| TS (kg/cm$^2$G) | 321 | 320 | 240 | 245 | 315 | 217 |
| EL (%) | 393 | 390 | 285 | 296 | 380 | 271 |
| Surface roughness ($\mu$m) | 2.5 | 2.4 | 3.8 | 3.7 | 2.8 | 4.4 |
| Whiteness (Z value) | 106 | 105 | 106 | 105 | 104 | 105 |
| Break down voltage (kV) | 3.2 | 3.3 | 1.5 | 1.5 | 2.8 | 1.5 |

As shown in Table 4, even if a primary particle size of a raw PTFE after the pulverization is from 150 to 300 $\mu$m, not only the apparent density can be increased but also the electrostatic charge can be made zero.

EXAMPLES 21 AND 22 AND COMPARATIVE EXAMPLES 7 AND 8

The same procedures as in Example 1 were repeated except that a raw PTFE powder shown in Table 5 was fused and the preparation conditions were those shown in Table 5 (organic liquid: dichloromethane), to give a PTFE granular powder containing no filler. The same tests as in Example 1 were carried out. The results are shown in Table 5.

TABLE 5

|  | Ex. 21 | Ex. 22 | Com. Ex. 7 | Com. Ex. 8 |
|---|---|---|---|---|
| Conditions of preparation |  |  |  |  |
| PTFE powder | M-12 | M-12 | M-12 | M-12 |
| Average particle size after pulverization ($\mu$m) | 149 | 280 | 149 | 280 |
| Surfactant (kind) | Puronon #104 | Puronon #104 | — | — |
| Surfactant (% by weight based on PTFE) | 0.025 | 0.025 | — | — |
| Liquid-liquid interface-forming organic liquid (kg) | 18.1 | 18.1 | 18.1 | 18.1 |
| Period of time for maintaining at 37° to 39° C. (min) | 15 | 15 | 15 | 15 |
| Physical properties of granular powder |  |  |  |  |
| Apparent density (g/cm$^3$) | 0.650 | 0.620 | 0.590 | 0.520 |
| Flowability | 8 | 8 | 8 | 8 |
| Angle of repose (degree) | 38.0 | 38.2 | 39.9 | 40.2 |
| Electrostatic charge (V) | 0 | 0 | 145 | 95 |
| Particle size distribution A (% by weight) |  |  |  |  |
| 10 on | 0.0 | 0.0 | 0.0 | 0.0 |
| 20 on | 2.0 | 2.9 | 1.7 | 1.8 |
| 32 on | 25.6 | 27.6 | 35.2 | 36.9 |
| 48 on | 36.1 | 36.1 | 22.9 | 22.1 |
| 60 on | 13.6 | 13.6 | 13.7 | 9.6 |
| 83 on | 10.0 | 8.9 | 10.1 | 10.5 |
| 83 pass | 12.8 | 10.9 | 16.5 | 19.0 |
| Particle size distribution B (% by weight) | 44.0 | 43.9 | 31.2 | 28.0 |

TABLE 5-continued

|  | Ex. 21 | Ex. 22 | Com. Ex. 7 | Com. Ex. 8 |
|---|---|---|---|---|
| Average particle size after granulation ($\mu$m) | 380 | 390 | 390 | 400 |

As shown in Table 5, even if a primary particle size of a raw PTFE after the pulverization is from 150 to 300 $\mu$m, not only the apparent density can be increased but also the electrostatic charge can be made zero.

INDUSTRIAL APPLICABILITY

The PTFE granular powder of the present invention containing no filler, which contains the almost spherical particles in its major portion has a large apparent density, a small average particle size, a small electrostatic charge and a narrow particle size distribution and is superior in powder flowability in spite of the small particle size. And, the molded product obtained from the granular powder is superior in tensile strength and elongation and has a low surface roughness, a high break down voltage and a high whiteness (Z value).

Also, the preparation process of the present invention not only can provide the PTFE granular powder having superior physical properties as mentioned above but also, particularly, can control the average particle size and particle size distribution by the amount of the surfactant, and can give the granular powder having a narrow particle size distribution.

What is claimed is:

1. A process for preparing a polytetrafluoroethylene granular powder containing no filler by granulation, in water with stirring, of a polytetrafluoroethylene powder prepared through suspension polymerization and having an average particle size of not less than 10 $\mu$m and less than 100 $\mu$m; characterized in that the granulation is carried out in the presence of an organic liquid which forms liquid-liquid interface with water, and a nonionic and/or anionic surfactant with stirring.

2. The process of claim 1, wherein the nonionic surfactant is a surfactant which has a hydrophobic segment comprising a poly(oxyalkylene) unit having 3 or 4 carbon atoms and a hydrophilic segment comprising a poly(oxyethylene) unit.

3. The process of claim 1, wherein the anionic surfactant is a fluorine-containing surfactant comprising a perfluoroalkyl group or a perchlorofluoroalkyl group as a hydrophobic group.

4. The process of claim 1, wherein an amounts of the surfactant is from 0.01 to 10% by weight on the basis of the polytetrafluoroethylene powder.

5. The process of claim 1, wherein the polytetrafluoroethylene is tetrafluoroethylene homopolymer or a modified polytetrafluoroethylene obtained by copolymerizing 99 to 99.999% by mole of tetrafluoroethylene and 1 to 0.001% by mole of a perfluorovinylether.

6. A polytetrafluoroethylene granular powder containing no filler, wherein said granular powder is obtainable by the process according to claim 1, and has an apparent density of not lower than 0.7 g/cm$^3$.

7. The granular powder of claim 6, wherein the granular powder has a powder flowability of not less than 6 times.

8. The granular powder of claim 6, wherein the granular powder has an angle of repose of not larger than 40 degrees.

9. The granular powder of claim 6, wherein the granular powder has an average particle size of not more than 500 μm.

10. The granular powder of claim 6, wherein an electrostatic charge of the granular powder is not more than 50 V.

11. The granular powder of claim 6, which provides a molded article having a whiteness; (Z value) of not less than 95.

12. The granular powder of claim 6, which provides a molded article having a breakdown voltage of not less than 7 kV in case of a 0.1 mm thick skived sheet.

13. The granular powder of claim 6, which provides a molded article having a surface roughness of not larger than 2.5 μm.

14. A polytetrafluoroethylene granular powder containing no filler which has an apparent density of not lower than 0.7 g/cm$^3$ and less than 0.9 g/cm$^3$, an average particle size of not less than 250 μm and less than 500 μm, an angle of repose of not larger than 38 degrees and an electrostatic charge of not more than 10 V, and provides a molded article having a whiteness (Z value) of not less than 95, a surface roughness of not larger than 2.5 μm and a break down voltage of not less than 7 kV in case of a 0.1 mm thick skived sheet.

15. A polytetrafluoroethylene granular powder containing no filler which has an apparent density of not lower than 0.9 g/cm$^3$ and less than 1.0 g/cm$^3$, an average particle size of not less than 250 μm and less than 500 μm, an angle of repose of not larger than 37 degrees and an electrostatic charge of not more than 10 V, and provides a molded article having a whiteness (Z value) of not less than 95, a surface roughness of not larger than 3.0 μm and a break down voltage of not less than 7 kV in case of a 0.1 mm thick skived sheet.

16. A polytetrafluoroethylene granular powder containing no filler which has an apparent density of not lower than 0.7 g/cm$^3$ and less than 0.9 g/cm$^3$ an average particle size of not less than 150 μm and less than 250 μm, an angle of repose of not larger than 38 degrees and an electrostatic charge of not more than 10 V, and provides a molded article having a whiteness (Z value) of not less than 95, a surface roughness of not larger than 2.0 μm and a break down voltage of not less than 7 kV in case of a 0.1 mm thick skived sheet.

17. A polytetrafluoroethylene granular powder containing no filler which has an apparent density of not lower than 0.9 g/cm$^3$ and less than 1.0 g/cm$^3$, average particle size of not less than 150 μm and less than 250 μm, an angle of repose of not larger than 37 degrees and an electrostatic charge of not more than 10 V, and provides a molded article having a whiteness (Z value) of not less than 95, a surface roughness of not larger than 2.5 μ and a break down voltage of not less than 7 kV in case of a 0.1 mm thick skived sheet.

* * * * *